United States Patent
Keren et al.

(10) Patent No.: US 12,205,001 B2
(45) Date of Patent: Jan. 21, 2025

(54) RANDOM CLASSIFICATION MODEL HEAD FOR IMPROVED GENERALIZATION

(71) Applicant: International Business Machines Corporation, Armonk, NY (US)

(72) Inventors: Yonatan Keren, Karmiel (IL); Yoel Shoshan, Haifa (IL); Vadim Ratner, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1004 days.

(21) Appl. No.: 17/183,385

(22) Filed: Feb. 24, 2021

(65) Prior Publication Data

US 2022/0269980 A1    Aug. 25, 2022

(51) Int. Cl.
G06N 20/00 (2019.01)
G06F 17/16 (2006.01)
G06F 18/2431 (2023.01)

(52) U.S. Cl.
CPC .............. *G06N 20/00* (2019.01); *G06F 17/16* (2013.01); *G06F 18/2431* (2023.01)

(58) Field of Classification Search
None
See application file for complete search history.

(56) References Cited

U.S. PATENT DOCUMENTS

| 10,402,748 | B2 | 9/2019 | Hemant | |
|---|---|---|---|---|
| 2021/0042629 | A1* | 2/2021 | Ezov | G06N 5/02 |
| 2022/0044116 | A1* | 2/2022 | Arani | G06N 3/045 |

OTHER PUBLICATIONS

Maennel, H. et al., "What do neural networks learn when trained with random labels?" Advances in Neural Information Processing Systems (2020) 12 pp. (Year: 2020).*
Zhang, C. et al., "Deep Learning and Structured Data," Thesis, Mass. Instit. of Techn. (Feb. 2018) 150 pp. (Year: 2018).*
Ren, C.-X. et al., "Domain adaptive person re-identification via camera style generation and label propagation," IEEE Trans. on Inform. Forensics and Security, vol. 15 (2020) pp. 1290-1301. (Year: 2020).*
Tsoumakas, G. et al., "Random k-labelsets for multi-label classification," IEEE Trans. on Knowledge and Data Engineering, vol. 23, Iss. 7 (2011) 12 pp. (Year: 2011).*

(Continued)

*Primary Examiner* — Brian M Smith
(74) *Attorney, Agent, or Firm* — Eyal Gilboa

(57) ABSTRACT

A method comprising: receiving a primary training set comprising annotated data samples associated with one or more classes and annotated with class labels; constructing an auxiliary training set comprising at least some of the data samples, wherein each of the data samples is assigned at random to one of a set of identification classes, and annotated with an identification label associated with the identification class; at a training stage, train a machine learning model comprising a primary and auxiliary prediction heads, by: (i) training the primary prediction head on the primary training set to predict the class, and (ii) training the auxiliary prediction head on the auxiliary training set to predict the identification class, wherein an output layer of the machine learning model is configured to output a joint prediction which predicts the class label and is invariant to the identification label.

20 Claims, 5 Drawing Sheets

(56) References Cited

OTHER PUBLICATIONS

Bhoomika Madhukar, "Guide to Adversarial Validation to Reduce Overfitting in Machine Learning", Online at https://analyticsindiamag.com/guide-to-adversarial-validation-to-reduce-overfitting-in-machine-learning/, Aug. 29, 2020.
Chiyuan Zhang, "Understanding Deep Learning Requires Re-Thinking Generalization", Online at https://arxiv.org/pdf/1611.03530.pdf, Feb. 26, 2017.
Chiyuan Zhang, "Understanding deep learning requires rethinking generalization", Published as a conference paper at ICLR, Feb. 24, 2017.
Geoffrey E. Hinton, "Improving neural networks by preventing co-adaptation of feature detectors", Online at https://arxiv.org/abs/1207.0580, Jul. 3, 2012.
Najeeb Khan, "Bridgeout: stochastic bridge regularization for deep neural networks", IEEE Access, Apr. 2018.
Qinghe Zheng, "A Full Stage Data Augmentation Method in Deep Convolutional Neural Network for Natural Image Classification", Hindawi Discrete Dynamics in Nature and Society, vol. 2020, Article ID 4706576, 11 pages, Jan. 11, 2020.
Taojiannan Yang, "GradAug: A New Regularization Method for Deep Neural Networks", University of North Carolina at Charlotte, Jun. 14, 2020.
Yaroslav Ganin, "Unsupervised Domain Adaptation by Backpropagation", Online at: https://arxiv.org/pdf/1409.7495.pdf, Feb. 27, 2015.

\* cited by examiner

RANDOM CLASSIFICATION MODEL HEAD FOR IMPROVED GENERALIZATION

BACKGROUND

The invention relates to the field of machine learning.

Machine learning is the study of computer algorithms which automatically improve through experience. It is often viewed as a subset of artificial intelligence (AI). Machine learning algorithms typically construct a mathematical model based on a collection of samples, also termed 'training data,' in order to infer predictions or decisions without being specifically programmed to do so.

Machine learning models are trained to categorize data and/or recognize patterns in data, based on training data samples encompassing one or more data classes. Machine learning models may be trained using a supervised training method, by iteratively minimizing a discrepancy (which may be represented by a loss function) between the model output and the original labels of the data samples in the training set. The ultimate goal of the trained machine learning model is to be able to minimize the error in classifying previously unseen data, known as the 'generalization error.' Thus, training machine learning models is an optimization problem where the training error serves as a proxy for the true objective: the generalization error.

However, in some cases, a model learns the detail and noise in the training data to the extent that it negatively impacts the performance of the model on new data. This phenomenon is termed 'overfitting,' where a model essentially memorizes the training data and is thus unable to generalize well on new, unseen data. In other words, instead of learning general patterns associated with the classification task, the model only learns patterns specific to the training data, which may be irrelevant in other data. In such cases, the model simply learns to 'memorize' the training data samples and cannot generalize from this learning to unseen data.

To overcome this problem, researchers have devised different strategies to prevent models from misinterpreting random variations in the training data as patterns associated with the labels. One potential solution is simply to increase the size and diversity of the training dataset; however, this is not always practicable. Another common solution is augmenting the data with new samples that are slight variations of the original samples. Other approaches include regularization schemes, such as model priming by removing redundant parts of the network, imposing weight penalties which favor simpler models over more complicated ones, and the like.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a computer-implemented method comprising: receiving a primary training set comprising annotated data samples that are each associated with one of one or more classes, and annotated with one corresponding class label of one or more class labels; constructing an auxiliary training set comprising at least some of the data samples, wherein each of the data samples in the auxiliary training set is assigned at random to one of a set of identification classes, and annotated with an identification label associated with the identification class to which it is assigned; and at a training stage, train a machine learning model comprising a primary and auxiliary prediction heads, by: (i) training the primary prediction head on the primary training set to predict the class associated with each of the data samples, and (ii) training the auxiliary prediction head on the auxiliary training set to predict the identification class associated with each of the data samples in the auxiliary training set, wherein an output layer of the machine learning model is configured to output a joint prediction which predicts the class label and is invariant to the identification label.

There is also provided, in an embodiment, a system comprising at least one hardware processor; and a non-transitory computer-readable storage medium having program code embodied therewith, the program code executable by the at least one hardware processor to: receive a primary training set comprising annotated data samples that are each associated with one of one or more classes, and annotated with one corresponding class label of one or more class labels, construct an auxiliary training set comprising at least some of the data samples, wherein each of the data samples in the auxiliary training set is assigned at random to one of a set of identification classes, and annotated with an identification label associated with the identification class to which it is assigned, and at a training stage, train a machine learning model comprising a primary and auxiliary prediction heads, by: (i) training the primary prediction head on the primary training set to predict the class associated with each of the data samples, and (ii) training the auxiliary prediction head on the auxiliary training set to predict the identification class associated with each of the data samples in the auxiliary training set, wherein an output layer of the machine learning model is configured to output a joint prediction which predicts the class label and is invariant to the identification label.

There is further provided, in an embodiment, a computer program product comprising a non-transitory computer-readable storage medium having program code embodied therewith, the program code executable by at least one hardware processor to: receive a primary training set comprising annotated data samples that are each associated with one of one or more classes, and annotated with one corresponding class label of one or more class labels; construct an auxiliary training set comprising at least some of the data samples, wherein each of the data samples in the auxiliary training set is assigned at random to one of a set of identification classes, and annotated with an identification label associated with the identification class to which it is assigned; and at a training stage, train a machine learning model comprising a primary and auxiliary prediction heads, by: (i) training the primary prediction head on the primary training set to predict the class associated with each of the data samples, and (ii) training the auxiliary prediction head on the auxiliary training set to predict the identification class associated with each of the data samples in the auxiliary training set, wherein an output layer of the machine learning model is configured to output a joint prediction which predicts the class label and is invariant to the identification label.

In some embodiments, the training of the primary prediction head is based on minimizing a primary loss function, and the training of the auxiliary prediction head is based on minimizing an auxiliary loss function.

In some embodiments, the training comprises joint training of the primary and auxiliary prediction heads, wherein the minimizing of the primary and auxiliary loss functions updates joint weights of the machine learning model by backpropagation of calculated gradients from each of the primary and auxiliary loss functions, and wherein the calculated gradients from the auxiliary loss function are backpropagated though a gradient reversal layer.

In some embodiments, the training comprises separate training of each of the primary and auxiliary prediction heads, and wherein the joint prediction is based on a combined loss function which comprises the (i) primary loss function and (ii) an inverse of the auxiliary loss function.

In some embodiments, the set of identification classes comprises two classes, and wherein the identification class labels are selected from a set of binary labels.

In some embodiments, the set of identification classes comprises K classes, and the identification class labels comprise a set of one-hot vectors, each of a length equal to K.

In some embodiments, the K is equal to a number of the data samples in the auxiliary training set.

In some embodiments, the set of identification classes comprises more than 2 classes, and wherein the identification class labels comprise random vectors of a predetermined length, each representing a location of one of the data samples in a vector space.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
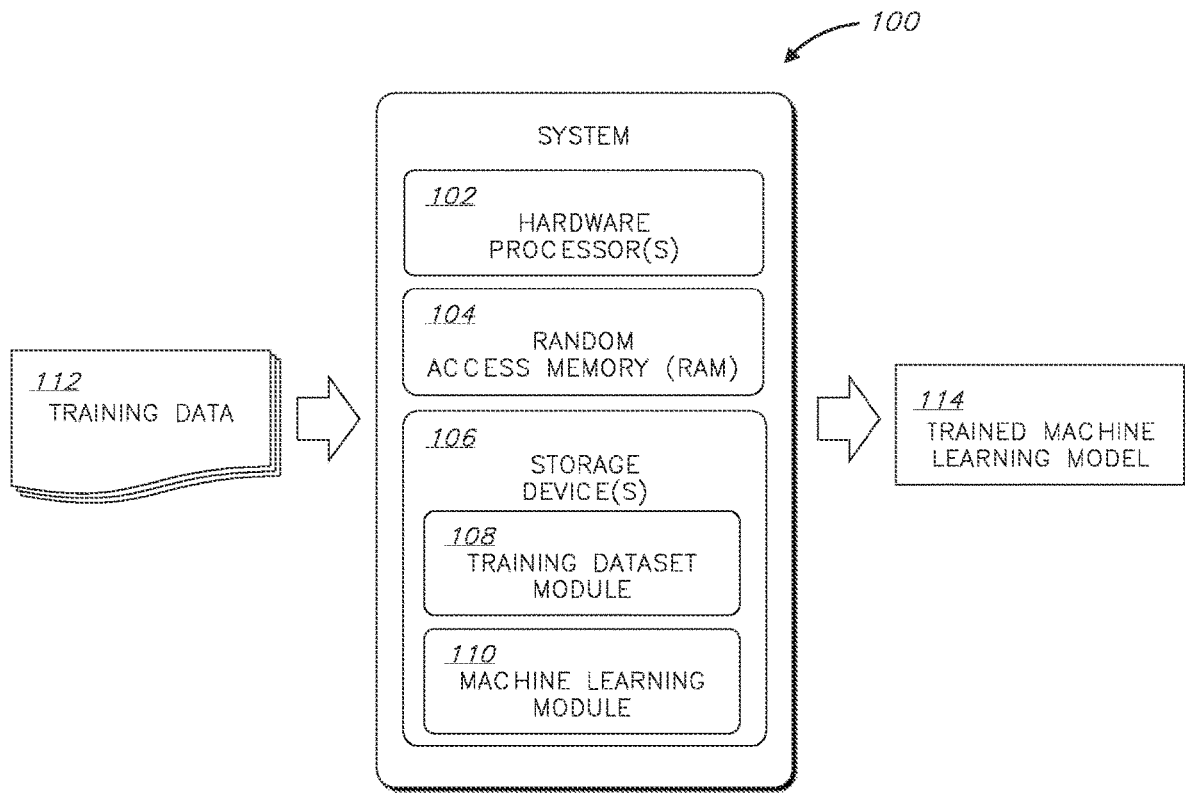
FIG. 1 is a block diagram of an exemplary system for enhancing generalization and reducing overfitting in machine learning models, according to an embodiment.

Disclosed herein is a technique, embodied in a system, method, and computer program product, for enhancing generalization and reducing overfitting in machine learning models.

The present technique, advantageously, provides for improving a generalization error and reducing overfitting in a machine learning model, based, at least in part, on a training scheme for a joint machine learning model which optimizes two separate machine learning tasks, which may be, e.g., a discriminative task (e.g., a classification task) or a generative task. In some embodiments, the training of the machine learning model of the present disclosure is based on minimizing a loss function with respect to each of the separate tasks.

In some embodiments, a machine learning model of the present disclosure may be trained to optimize at least two separate prediction heads, as follows:

A class-based head trained to learn a machine learning task (e.g., a discriminative task or a generative task) based on a training dataset comprising data samples encompassing one or more 'ground truth' data classes and class labels associated with these one or more data classes. The weights of the class-based head may be trained to identify the class labels assigned to the data samples in the training set, by minimizing a class loss function; and An identification-based head trained on at least a portion of the training dataset used to train the class-based head, however, using a random labeling scheme, wherein each data sample may be labeled with a randomly-selected identification label from a provided label set. The training scheme for the identification-based head may be configured to train the weights of the identification-based head to identify the identification label assigned to the data samples in the training set, by minimizing an identification loss function.

In some embodiments, a machine learning model of the present disclosure combines the loss functions of the class and identification-based heads into a combined loss function, in which, however, the identification loss function is reversed so as to produce a model which is optimized to (i) predict the original 'ground truth' class labels of the data samples in the training dataset, but (ii) is invariant to the identification labels assigned to the data samples in the training set.

As used herein, 'machine learning model' refers broadly to any of several methods and/or algorithms which are configured to perform a specific informational task (such as classification or regression) using a limited number of examples of data of a given form, and are then capable of exercising this same task on unknown data of the same type and form. A machine learning model may be implemented using various model architectures, e.g., convolutional neural network (CNN), recurrent neural network (RNN), or deep neural network (DNN), but may be any machine learning model which is trained based on a minimization of a loss function. This disclosure, although often exemplifying the present technique with reference to the machine learning tasks of classification and generative tasks, may be directly applicable to any other type of machine learning tasks—as those of skill in the art will recognize. For example, machine learning tasks such as object detection, segmentation, Natural Language Processing (NLP), etc., which employ various model architectures, are all explicitly intended herein. Generally, the present technique may apply to any machine learning task which involves training a model based on an optimization scheme which minimizes a loss function.

An accuracy measure of a machine learning model reflects the ability of a trained machine learning model to correctly recognize a pattern in data, or recognize a class to which data belongs. Accuracy of machine learning models may be defined as the percentage of samples which the trained machine learning model accurately classifies, e.g., at least 60%, 70%, 80%, 90%, 95%, 99%, or 100% accuracy.

Data in the context of machine learning models may be derived from sources that include, but are not limited to, image data, biological data, chemical data, population data, financial data, climate data, etc. Training data samples used to train a machine learning model include data samples for each class, wherein a class in this context is a category to which a data sample may belong. Data may encompass more than one feature, or numerical component of the data, where the number of features corresponds to the dimensionality of the data. Data encompassing n different dimensions may be described as n-dimensional. The number of dimensions of data may be increased or decreased in order to optimize the information that may be obtained from the data.

As used herein, 'generalization' refers to the ability of a machine learning model trained using a training data set to categorize and/or recognize patterns in data contained in a new test data set with sufficient accuracy. 'Overfitting' refers to an error introduced in training by making the trained model too specific to the training data set, so that the ability of the trained model to generalize is adversely affected.

As used herein, 'weights,' in the context of a machine learning model, refers broadly to learnable parameters of a machine learning model. During training, the weights are determined based on an optimization scheme which minimizes a loss function. Once trained, as inputs are propagated through layers of a model, the trained weights are applied to the inputs, so as to determine how much influence an input will have on the output of the model.

Reference is now made to FIG. 1, which shows a block diagram of an exemplary system 100 for enhancing generalization and reducing overfitting in machine learning models, according to an embodiment. System 100 may include one or more hardware processor(s) 102, a random-access memory (RAM) 104, and one or more non-transitory computer-readable storage device(s) 106.

Storage device(s) 106 may have stored thereon program instructions and/or components configured to operate hardware processor(s) 102. The program instructions may include one or more software modules, such as a training dataset module 108 and/or a machine learning module 110. The software components may include an operating system having various software components and/or drivers for controlling and managing general system tasks (e.g., memory management, storage device control, power management, etc.), and facilitating communication between various hardware and software components.

System 100 may operate by loading instructions of training dataset module 108 and/or machine learning module 110 into RAM 104 as they are being executed by processor(s) 102.

In some embodiments, the instructions of training dataset module 108 may cause system 100 to receive training data 112, process it, and output one or more training datasets, each comprising a plurality of annotated data samples, based on one or more annotation schemes.

In some embodiments, the instructions of machine learning module 110 may cause system 100 to train and implement a machine learning model using the one or more training datasets constructed by training dataset module 108, and to output a trained machine learning model 114. In some embodiments, machine learning module 110 may implement a machine learning model using various model architectures, e.g., convolutional neural network (CNN), recurrent neural network (RNN), or deep neural network (DNN), adversarial neural network (ANN), and/or any other machine learning model which may be trained based on a minimization of a loss function. In some embodiments, machine learning module 110 may implement a machine learning model of the present disclosure using an architecture configured to jointly learn two or more machine learning tasks, e.g., two or more discriminative e.g., classification) or generative tasks. In some embodiments, such architecture may comprise joint networks, a main network and a sub- or auxiliary network, a network comprising two or more separate prediction heads, and/or any other suitable architecture for jointly learning a model to perform two or more machine learning tasks. In some embodiments, the instructions of machine learning module 110 may cause system 100 to train the multiple tasks of the machine learning model using the one or more training sets constructed by training dataset module 108. In some embodiments, the training comprises an iterative optimization process, based on two or more loss functions. In some embodiments, a machine learning model architecture or the present disclosure comprises an output layer which outputs a joint inference of the model, based on a combination, which may be a weighted combination, of the separate loss functions used to jointly train the model.

System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as a motherboard, data busses, power supply, a network interface card, a display, an input device (e.g., keyboard, pointing device, touch-sensitive display), etc. (not shown). Moreover, components of system 100 may be co-located or distributed, or the system may be configured to run as one or more cloud computing "instances," "containers," "virtual machines," or other types of encapsulated software applications, as known in the art. As one example, system 100 may in fact be realized by two separate but similar systems, one with training dataset module 108 and the other with machine learning module 110. These two systems may cooperate, such as by transmitting data from one system to the other (over a local area network, a wide area network, etc.), so as to use the output of one module as input to the other module.

Figure 2:
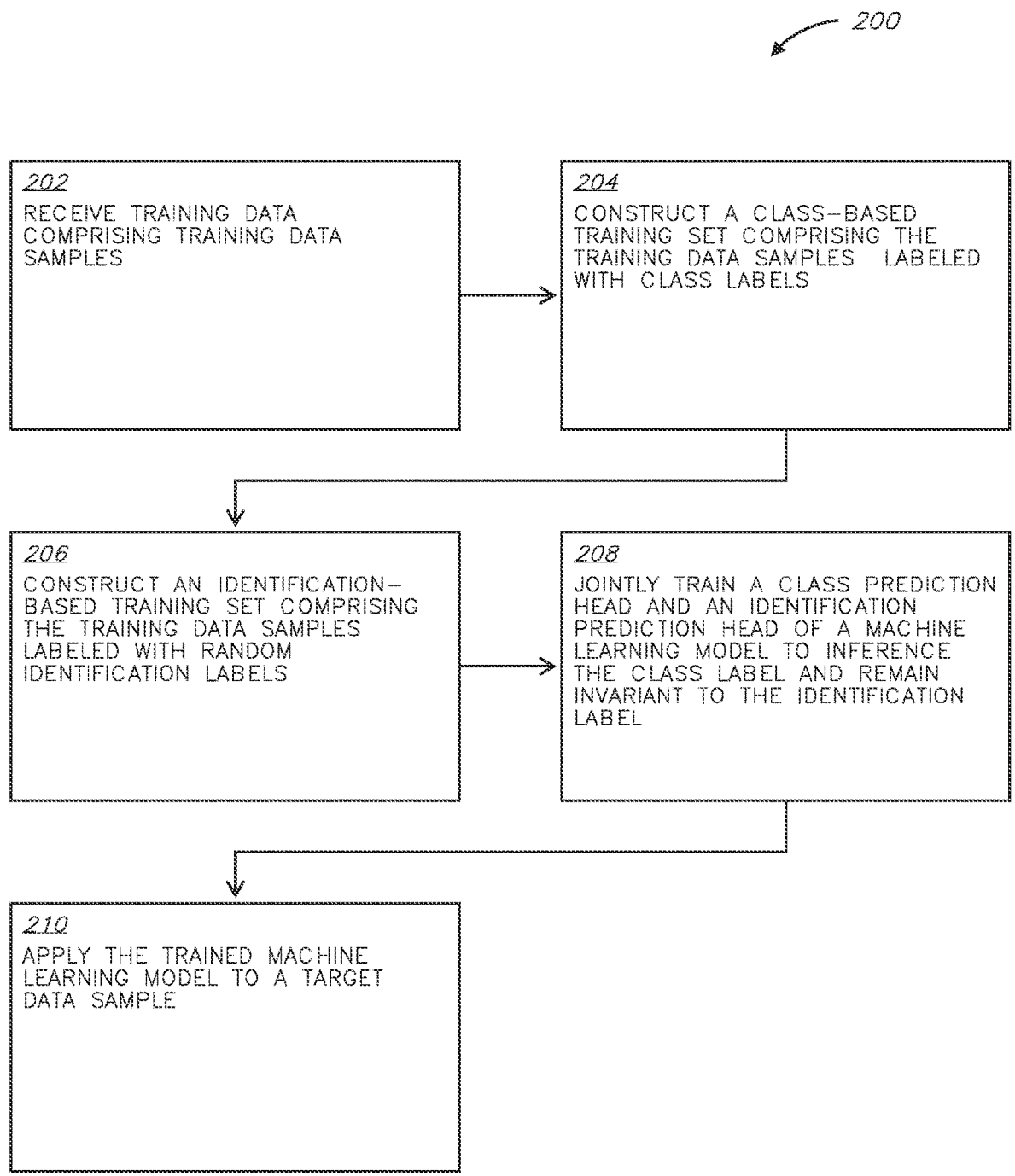
FIG. 2 is a flowchart which illustrates the functional steps in a method for enhancing generalization and reducing overfitting in machine learning models, according to an embodiment.

The instructions of training dataset module 108 and/or machine learning module 110 are now discussed with reference to the flowchart of FIG. 2, which illustrates the functional steps in a method 200 for enhancing generalization and reducing overfitting in machine learning models, according to an embodiment.

The various steps of method 200 may either be performed in the order they are presented or in a different order (or even in parallel), as long as the order allows for a necessary input to a certain step to be obtained from an output of an earlier step. In addition, the steps of method 200 are performed automatically (e.g., by system 100 of FIG. 1), unless specifically stated otherwise.

In step 202, a dataset including data samples (which may be fully or partially annotated) may be received, e.g., by training dataset module 108 of system 100. The data samples may encompass one or more data classes, wherein at least some of the data samples may be annotated with class labels associated with the class to which they belong. In some embodiments, data samples may be derived from any information sources that include, but are not limited to, image data, biological data, chemical data, population data, financial data, climate data, etc. In some embodiments, data samples received in step 202 may include at least one positive and one negative data samples for each class, wherein a class in this context is a category to which a data sample may belong. Data samples may encompass more than one feature, or numerical component of the data, where the number of features corresponds to the dimensionality of the data. Data encompassing n different dimensions may be described as n-dimensional. The number of dimensions of data may be increased or decreased in order to optimize the information that may be obtained from the data.

In step 204, training dataset module 108 may construct one or more training datasets using a portion or all of the data samples received in step 202, for training a machine learning model of the present disclosure. In some embodiments, training dataset module 108 may construct a class-based training dataset, e.g., a training dataset for training a class-based head of the present machine learning model to learn a discriminative e.g., classification) or generative task associated with the data classes represented in the training set. The data samples in the class-based training dataset may be labeled with labels representing a 'ground truth' data class of each data sample. In some embodiments, each label in the class-based training dataset may be one or a few words of text, or any other string or vector of data, text, numbers, and/or symbols representing the one or more data classes. In some embodiments, the labels may be pre-assigned to the data samples, and/or associated with data samples, at least in part, during the performance of step 204, e.g., manually, semi-automatically, and/or automatically, by and/or using training dataset module 108.

In some embodiments, in step 206, training dataset module 108 may construct an identification-based training dataset, e.g., a training dataset for training an identification-based head of the present machine learning model to identify an identification label assigned to the data samples in the training set.

In some embodiments, the data samples in the identification-based training dataset may be assigned at random into a specified number of classes, wherein each data sample assigned to a class is annotated with an identification label associated with the class. In some embodiments, the number of classes may range from 2 (resulting in binary labeling, e.g., 0 or 1) to the actual number of data samples in the set (resulting in each data sample being assigned to its own separate class), including any number of classes between 2 and the number of data samples in the set. The identification-based training dataset may be used to train the identification-based head to identify the identification label assigned to the data samples in the training set.

In some embodiments, training dataset module 108 may be configured to provide for a labeling scheme for the identification-based training dataset, wherein each data sample is annotated with a label associated with the class to which it is assigned. For example, training dataset module 108 may be configured to apply one or more of the following labeling schemes to the identification-based training dataset:

Binary labeling: Each data sample is assigned at random to one of a set of binary classes, wherein each data sample is annotated with a binary label, e.g., 0 or 1, associated with the class to which it is assigned.

One-hot labeling: Each data sample is assigned at random to one of a set of K classes, wherein the size K may be set at any number between 3 and a number of data samples in the training dataset. Each data sample is annotated with a one-hot vector associated with the class to which it is assigned. In some embodiments, K is equal to the number of data samples in the training dataset, such that each data sample may receive a unique one-hot vector label.

Representation vector labeling: Each data sample is assigned at random a vector of a predetermined length which represents a location of the data sample in a vector space.

The number of classes and a labeling scheme may be selected by training dataset module 108 based on considerations of, e.g., a type of data associated with the data samples (e.g., image data, video data, textual data, audio data, biological or chemical data, etc.), the particular classification task which the machine learning model is called to perform, the amount of computational resources required to perform training and/or inference using the various class and labeling schemes, and the like.

In some embodiments, in step 208, the instructions of machine learning module 110 may cause system 100 to jointly train a machine learning model of the present disclosure, using the class-based and identification-based training datasets constructed in steps 204 and 206.

In some embodiments, the machine learning model may comprise an architecture configured to jointly learn two or more machine learning tasks, e.g., two or more discriminative (e.g., classification) and/or generative tasks. In some embodiments, such an architecture may comprise joint networks, a main network and a sub- or auxiliary network, a network comprising two or more separate prediction heads, and/or any other suitable architecture for jointly learning a model to perform two or more machine learning tasks. In some embodiments, the multiple tasks of the machine learning model may be learned jointly using the one or more training sets constructed in steps 204 and 206.

In some embodiments, a machine learning model of the present disclosure may comprise two or more prediction heads, e.g., a primary and a sub- or auxiliary prediction heads (which may be the class-based head and identification-based head, respectively). In such embodiments, each prediction head may be jointly trained in an iterative process over multiple epochs, wherein in each epoch, joint model weights are evaluated using a loss function, and are updated using backpropagation of the loss errors from each of the prediction heads. In such cases, in each epoch, the optimization algorithm seeks to adjust the joint model weights, so that the next epoch reduces the error, meaning the optimization algorithm is navigating down the slope of error. In such examples, an output layer of the model may output an inference result of the primary prediction head (e.g., the class-based head), wherein the inference result reflects the joint weights of the model as updated based on the joint training of both prediction heads. In some embodiments, the backpropagation process may involve a gradient reversal layer which reverses a gradient backpropagated form the sub- or auxiliary prediction head.

In some embodiments, a machine learning model of the present disclosure may comprise two or more prediction heads, which may be the class-based head and identification-based head, configured to learn competing machine learning tasks. In such embodiments, each prediction head may be separately trained to optimize its task, based on a loss function, as described above. In such examples, an output layer of the model may output an inference result based on a combination of the loss functions of the class and identification-based heads, wherein the identification loss may be reversed.

Figure 3A:
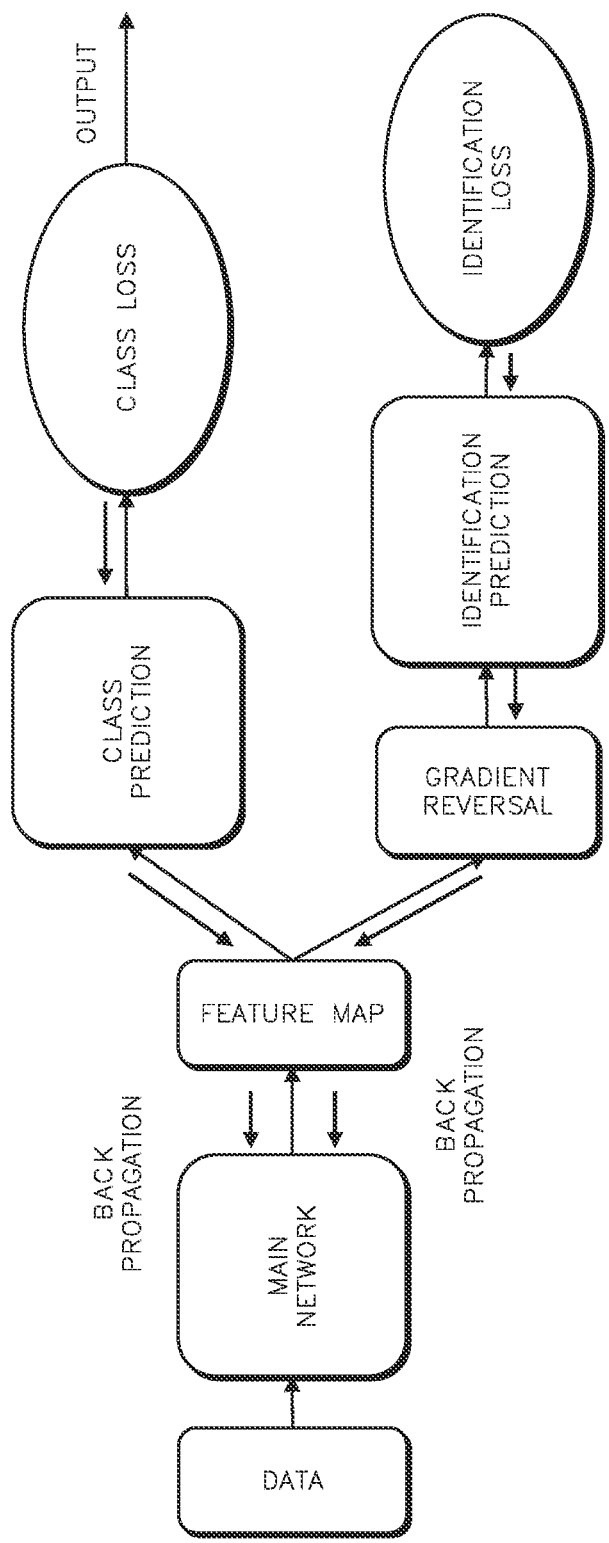
FIGS. 3A-3C schematically depict exemplary architectures and associated training processes which may be employed in conjunction with a machine learning model of the present disclosure.
Figure 3B:
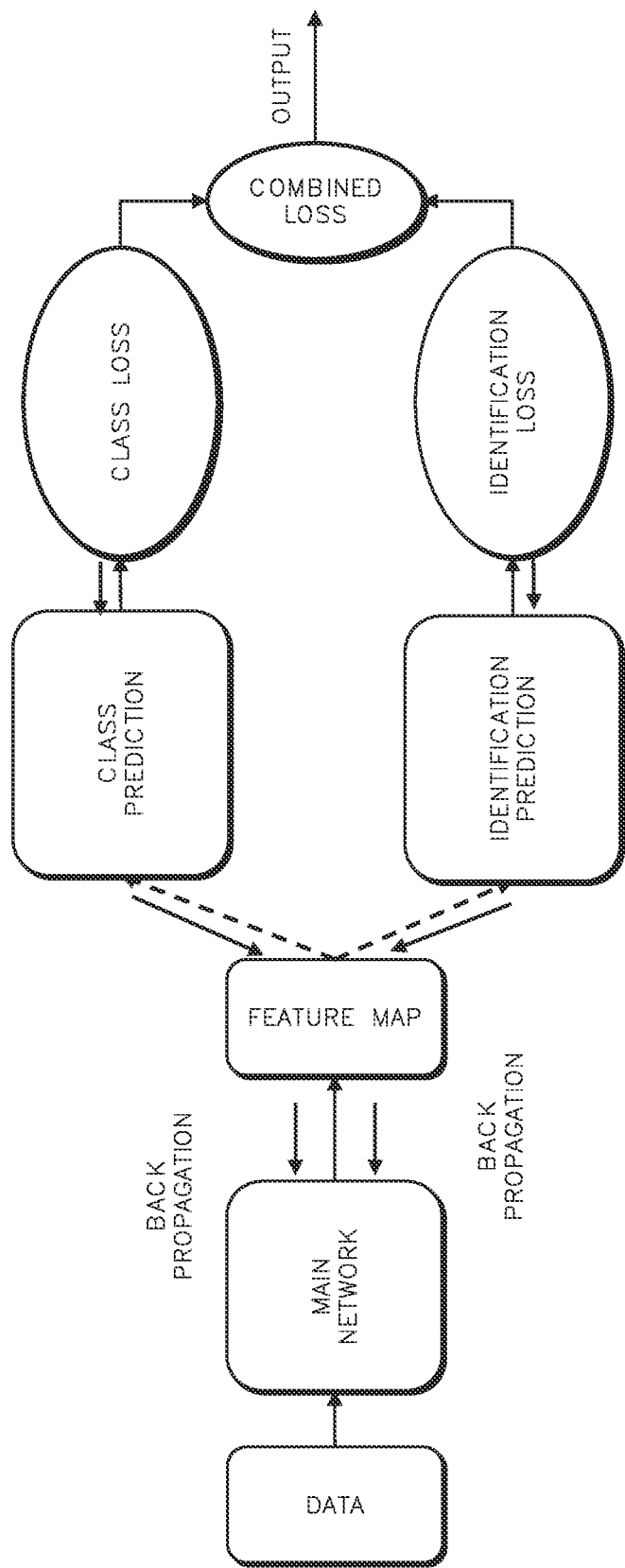
Figure 3C:
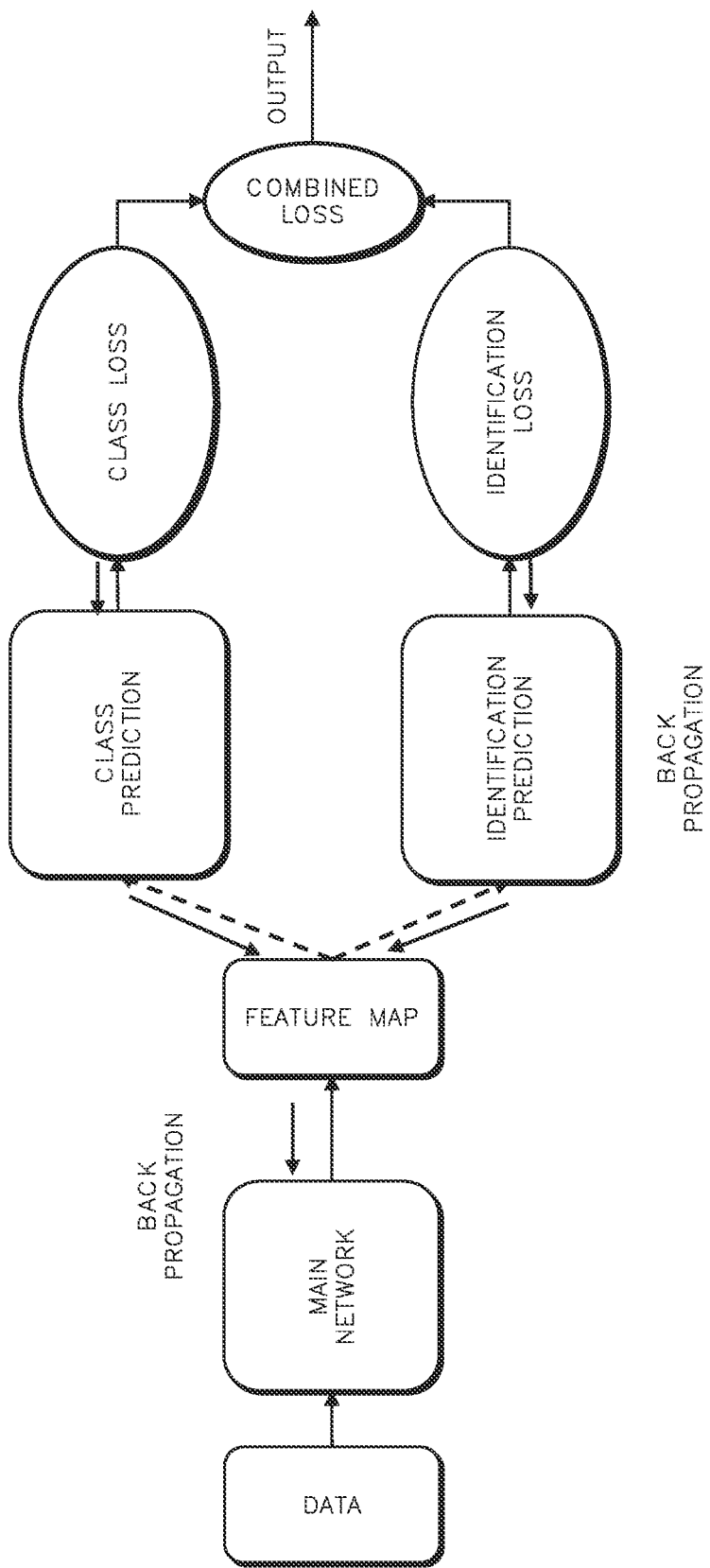

FIGS. 3A-3C schematically depict exemplary machine learning model architectures which may be employed in conjunction with a machine learning model of the present disclosure. Each of the depicted architectures may comprise one or more layers, e.g., one or more of each of the following layers: a convolutional layer, a clustering layer, a pooling layer, a hidden layer, and an output layer. In some embodiments, each of the depicted architectures may comprise, e.g., a main network block comprising, e.g., one or more neural network layers. The main network block can be assembled using any type of architecture relevant to the problem at hand (e.g., convolutional, fully connected or recurrent architectures). In some embodiments, the main network may be connected to a feature map layer, which may lead into two or more prediction head networks, e.g., a primary and sub- or auxiliary prediction heads.

With reference to FIG. 3A, an exemplary machine learning model architecture which may be employed in conjunction with a machine learning model of the present disclosure, may comprise a main network which receives and processes the input data, a feature map layer, and two prediction head networks—e.g., a class-based head and an identification-based head. The prediction heads may be jointly trained by minimizing respective loss functions. For example, the class-based head may be trained to identify the 'ground truth' class labels assigned to the data samples in the training set constructed in step 204, by minimizing a class loss function. Similarly, the identification-based head may be trained to identify the identification label assigned to the data samples in the training set constructed in step 206, by minimizing an identification loss function, e.g., a cross-entropy loss function. In some embodiments, the optimization is done using, e.g., a gradient descent algorithm. The gradients of the loss functions are then calculated using the backpropagation algorithm, and are used to update the joint network weights. However, in some embodiments, the calculated gradients from the identification-based head are backpropagated through a gradient reversal layer, which leaves the input unchanged during feedforward but reverses the gradients by multiplying them by a negative scalar during the backpropagation. Thus, in essence, the identification-based head updates the joint weights of the network so as to perform poorly in the task of predicting the identification label of the data samples. Overall, the machine learning model may be trained to output an inference result (e.g., a classification or generative prediction result) with respect to the 'ground truth' class of the input data, while remaining invariant to the identification labels assigned thereto. In some embodiments, an output layer of the model may output an inference result of the class-based head, wherein the inference result reflects the joint weights of the model as trained based on the joint training of both prediction heads.

FIG. 3B shows another exemplary machine learning model architecture which may be employed in conjunction with a machine learning model of the present disclosure. The architecture of the model shown in FIG. 3B may comprise an adversarial architecture in which the two prediction heads compete with each other, wherein the class-based head's training objective is to identify the 'ground truth' class labels assigned to the data samples in the training set constructed in step 204, and the identification-based head's training objective is to identify the identification label assigned to the data samples in the training set constructed in step 206. In some embodiments, each prediction head is trained separately in turn, and backpropagates its calculated gradients to the main network. In some embodiments, an output layer of the model may output a combined loss function of the model, which comprises the loss function of the class-based head and an inverse of the loss function of the identification-based head, such that overall, the class-based head learns to (i) output an inference result (e.g., a classification or gen- erative prediction result) with respect to the 'ground truth' class labels of the data samples, but (ii) is invariant to the identification labels assigned to the data samples.

FIG. 3C shows a variation of the architecture in FIG. 3B, which similarly comprises an adversarial architecture in which the two prediction heads compete with each other, wherein the class-based head's training objective is to identify the 'ground truth' class labels assigned to the data samples in the training set constructed in step 204, and the identification-based head's training objective is to identify the identification label assigned to the data samples in the training set constructed in step 206. In some embodiments, each prediction head is trained separately and backpropagates its calculated gradients. However, the identification-based head only backpropagates its calculated gradients to the feature map layer, and not to the main network. Similarly to the exemplary architecture in FIG. 3B, In some embodiments, an output layer of the model may output a combined loss function of the model, which comprises the loss function of the class-based head and an inverse of the loss function of the identification-based head, such that overall, the class-based head learns to (i) output an inference result (e.g., a classification or generative prediction result) with respect to the 'ground truth' class labels of the data samples, but (ii) is invariant to the identification labels assigned to the data samples.

Finally, in some embodiments, in step 210, the trained machine learning model of the present disclosure may be applied to a target data sample, to perform a desired classification task.

The present invention may be a computer system, a computer-implemented method, and/or a computer program product. The computer program product may include a computer readable storage medium (or media) having computer readable program instructions thereon for causing a hardware processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (MVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, a field-programmable gate array (FPGA), or a programmable logic array (PIA) may execute the computer readable program instructions by utilizing state information of the computer readable program instructions to personalize the electronic circuitry, in order to perform aspects of the present invention. In some embodiments, electronic circuitry including, for example, an application-specific integrated circuit (ASIC), may be incorporate the computer readable program instructions already at time of fabrication, such that the ASIC is configured to execute these instructions without programming.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a hardware processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range—10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A computer-implemented method comprising:
receiving a primary training set comprising annotated data samples that are each associated with one of one or more classes, and are each annotated with one corresponding class label of one or more class labels;
constructing an auxiliary training set comprising at least some of said data samples, wherein each of said data samples in said auxiliary training set is assigned at random to one of a set of identification classes, and annotated with an identification label associated with said identification class to which it is assigned; and
at a training stage, train a machine learning model comprising a primary and auxiliary prediction heads, by:
(i) training said primary prediction head on said primary training set to predict said class associated with each of said data samples, and
(ii) training said auxiliary prediction head on said auxiliary training set to predict said identification class associated with each of said data samples in said auxiliary training set,
wherein an output layer of said machine learning model is configured to output a joint prediction which predicts said class label and is invariant to said identification label.

2. The computer-implemented method of claim 1, wherein said training of said primary prediction head is based on minimizing a primary loss function, and said training of said auxiliary prediction head is based on minimizing an auxiliary loss function.

3. The computer-implemented method of claim 2, wherein said training comprises joint training of said primary and auxiliary prediction heads, wherein said minimizing of said primary and auxiliary loss functions updates joint weights of said machine learning model by backpropagation of calculated gradients from each of said primary and auxiliary loss functions, and wherein said calculated gradients from said auxiliary loss function are backpropagated though a gradient reversal layer.

4. The computer-implemented method of claim 2, wherein said training comprises separate training of each of said primary and auxiliary prediction heads, and wherein said joint prediction is based on a combined loss function which comprises said (i) primary loss function and (ii) an inverse of said auxiliary loss function.

5. The computer-implemented method of claim 1, wherein said set of identification classes comprises two classes, and wherein said identification class labels are selected from a set of binary labels.

6. The computer-implemented method of claim 1, wherein said set of identification classes comprises K classes, and said identification class labels comprise a set of one-hot vectors, each of a length equal to K.

7. The computer-implemented method of claim 6, wherein K is equal to a number of said data samples in said auxiliary training set.

8. The computer-implemented method of claim 1, wherein said set of identification classes comprises more than two classes, and wherein said identification class labels comprise random vectors of a predetermined length, each representing a location of one of the said data samples in a vector space.

9. A system comprising:
at least one hardware processor; and
a non-transitory computer-readable storage medium having program code embodied therewith, the program code executable by said at least one hardware processor to:
receive a primary training set comprising annotated data samples that are each associated with one of one or more classes, and annotated with one corresponding class label of one or more class labels,
construct an auxiliary training set comprising at least some of said data samples, wherein each of said data samples in said auxiliary training set is assigned at random to one of a set of identification classes, and annotated with an identification label associated with said identification class to which it is assigned, and
at a training stage, train a machine learning model comprising a primary and auxiliary prediction heads, by:
(i) training said primary prediction head on said primary training set to predict said class associated with each of said data samples, and
(ii) training said auxiliary prediction head on said auxiliary training set to predict said identification class associated with each of said data samples in said auxiliary training set,
wherein an output layer of said machine learning model is configured to output a joint prediction which predicts said class label and is invariant to said identification label.

10. The system of claim 9, wherein said training of said primary prediction head is based on minimizing a primary loss function, and said training of said auxiliary prediction head is based on minimizing an auxiliary loss function.

11. The system of claim 10, wherein said training comprises joint training of said primary and auxiliary prediction heads, wherein said minimizing of said primary and auxiliary loss functions updates joint weights of said machine learning model by backpropagation of calculated gradients from each of said primary and auxiliary loss functions, and wherein said calculated gradients from said auxiliary loss function are backpropagated though a gradient reversal layer.

12. The system of claim 10, wherein said training comprises separate training of each of said primary and auxiliary prediction heads, and wherein said joint prediction is based on a combined loss function which comprises said (i) primary loss function and (ii) an inverse of said auxiliary loss function.

13. The system of claim 9, wherein said set of identification classes comprises two classes, and wherein said identification class labels are selected from a set of binary labels.

14. The system of claim 9, wherein said set of identification classes comprises K classes, and said identification class labels comprise a set of one-hot vectors, each of a length equal to K.

15. The system of claim 9, wherein said set of identification classes comprises more than 2 classes, and wherein said identification class labels comprise random vectors of a predetermined length, each representing a location of one of the said data samples in a vector space.

16. A computer program product comprising a non-transitory computer-readable storage medium having program code embodied therewith, the program code executable by at least one hardware processor to:
receive a primary training set comprising annotated data samples that are each associated with one of one or more classes, and annotated with one corresponding class label of one or more class labels;

construct an auxiliary training set comprising at least some of said data samples, wherein each of said data samples in said auxiliary training set is assigned at random to one of a set of identification classes, and annotated with an identification label associated with said identification class to which it is assigned; and at a training stage, train a machine learning model comprising a primary and auxiliary prediction heads, by:
(i) training said primary prediction head on said primary training set to predict said class associated with each of said data samples, and
(ii) training said auxiliary prediction head on said auxiliary training set to predict said identification class associated with each of said data samples in said auxiliary training set, wherein an output layer of said machine learning model is configured to output a joint prediction which predicts said class label and is invariant to said identification label.

17. The computer program product of claim 16, wherein said training of said primary prediction head is based on minimizing a primary loss function, and said training of said auxiliary prediction head is based on minimizing an auxiliary loss function.

18. The computer program product of claim 17, wherein said training comprises joint training of said primary and auxiliary prediction heads, wherein said minimizing of said primary and auxiliary loss functions updates joint weights of said machine learning model by backpropagation of calculated gradients from each of said primary and auxiliary loss functions, and wherein said calculated gradients from said auxiliary loss function are backpropagated though a gradient reversal layer.

19. The computer program product of claim 17, wherein said training comprises separate training of each of said primary and auxiliary prediction heads, and wherein said joint prediction is based on a combined loss function which comprises said (i) primary loss function and (ii) an inverse of said auxiliary loss function.

20. The computer program product of claim 16, wherein said set of identification classes comprises two classes, and wherein said identification class labels are selected from a set of binary labels.

* * * * *